United States Patent [19]

Cacciotti

[11] Patent Number: 4,834,595

[45] Date of Patent: May 30, 1989

[54] COMPUTER CONTROLLED ENGRAVING BY A ROTATING MILLING TOOL

[75] Inventor: Angelo Cacciotti, Rome, Italy

[73] Assignee: Grandi Servizi S.p.A., Rome, Italy

[21] Appl. No.: 19,279

[22] PCT Filed: May 23, 1986

[86] PCT No.: PCT/IT86/00038

§ 371 Date: Jan. 22, 1987

§ 102(e) Date: Jan. 22, 1987

[87] PCT Pub. No.: WO86/07015

PCT Pub. Date: Dec. 4, 1986

[30] Foreign Application Priority Data

May 24, 1985 [IT] Italy .............................. 48116 A/85

[51] Int. Cl.⁴ ........................... B23C 3/00; B44B 3/02

[52] U.S. Cl. ....................................... 409/80; 409/187; 409/84; 364/474.02; 400/17

[58] Field of Search ........................ 400/88, 17, 18, 19, 400/20; 33/18.1, 18.2; 101/32, 4; 409/187, 188, 193, 194, 195, 80, 218, 84; 364/474

[56] References Cited

U.S. PATENT DOCUMENTS

| | | | |
|---|---|---|---|
| 3,143,041 | 8/1964 | Namenyi-Katz | 409/187 X |
| 4,089,262 | 5/1978 | Sapora | 101/4 |
| 4,254,552 | 3/1981 | Samis | 400/18 X |
| 4,367,588 | 1/1983 | Herbert | 33/18.1 X |
| 4,439,834 | 3/1984 | Dahlgren, Jr. et al. | 33/18.1 X |
| 4,451,187 | 5/1984 | Ishikawa et al. | 409/187 |
| 4,451,892 | 5/1984 | McMurtry | 364/474 |
| 4,523,865 | 6/1985 | Schacht | 400/18 |
| 4,527,244 | 7/1985 | Graham, Jr. et al. | 364/474 |
| 4,631,683 | 12/1986 | Thomas et al. | 364/474 |
| 4,648,184 | 3/1987 | Schuir et al. | 400/19 |
| 4,718,000 | 1/1988 | Held | 364/474 X |

FOREIGN PATENT DOCUMENTS

| | | | |
|---|---|---|---|
| 36843 | 9/1981 | European Pat. Off. | 33/18.2 |

OTHER PUBLICATIONS

Mink, "Compact, Flat-Bed/Display Typewriter"; IBM Technical Disclosure Bulletin, vol. 25, No. 7A, Dec. 1982, pp. 3196–3197.

*Primary Examiner*—Clifford D. Crowder
*Attorney, Agent, or Firm*—Blum Kaplan

[57] ABSTRACT

Method and apparatus for engraving a surface by a rotating tool movable along X, Y and Z axes under computer control. The tool projects through a slit in a housing, the slit having a height greater than that of the characters to be engraved and a length longer than the series of characters to be engraved. Mechanical structure is contained in the housing to drive the tool along X and Y axes for forming the characters and along a Z axis to engage the work. The beginning and end of the engraving operation as well as character size and sequence are all controlled by a computer.

15 Claims, 6 Drawing Sheets

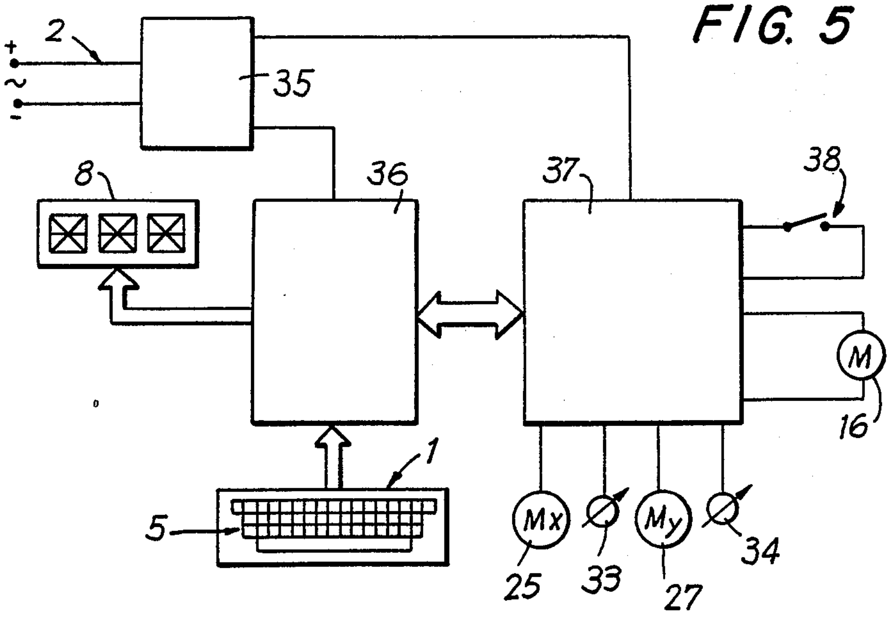
FIG. 5
FIG. 6
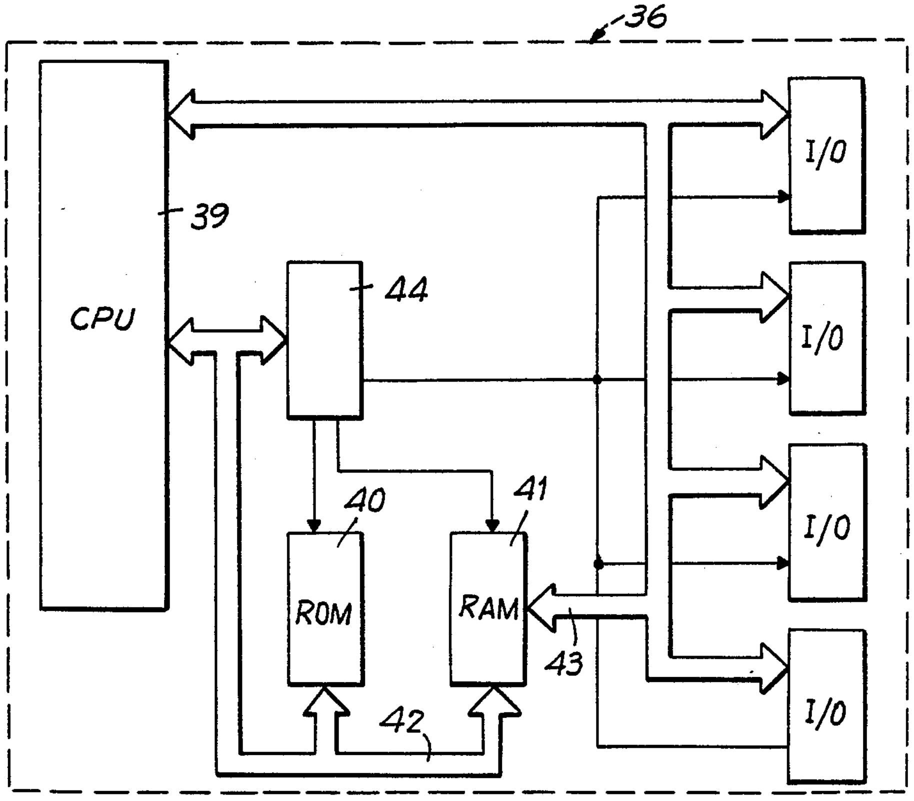

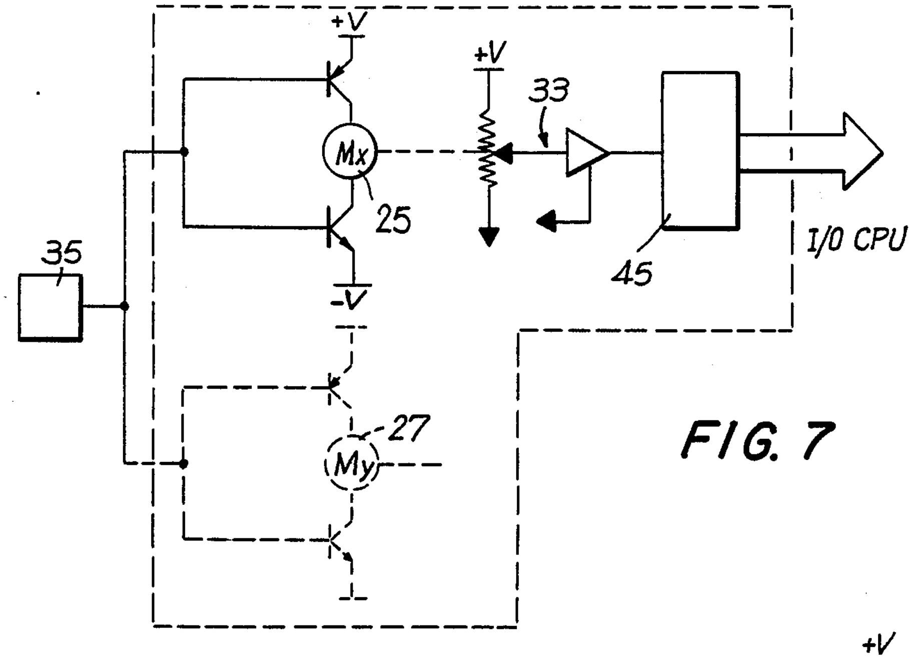
FIG. 7
FIG 9
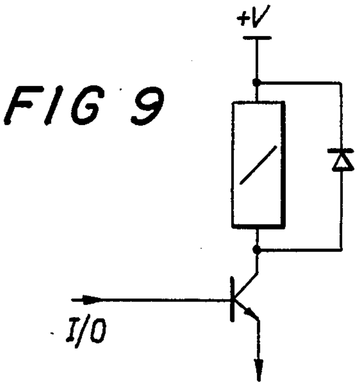
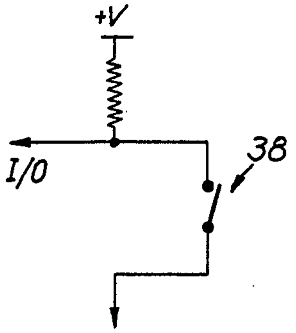
FIG 8
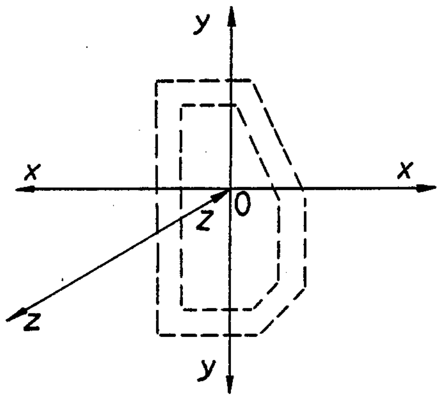
FIG. 10

COMPUTER CONTROLLED ENGRAVING BY A ROTATING MILLING TOOL

The present invention relates to a method and an apparatus for engraving in indelible way type by type a mark formed of numbers and/or letters and/or symbols on a plane or slightly curved surface in order to make personal belongings the marked thing or article, e.g. a car or the like for anti-theft or identification purposes.

Systems and apparatus for similar purposes are already known.

In the known and very diffused apparatus the marking is carried out by means of a device delivering a strong jet of a mixture of compressed air and abrasive granules which are projected on a limited area of the surface to be masked through a mask almost put into contact with said surface. Slits having a form complementary to that of the numbers, letters or symbols to be marked are provided in the mask. In some cases said mask is formed of elements which can be arranged in order to form one of the numbers, letters or symbols of the wording to be provided.

Such known apparatus are used in particular for marking glasses or metallic surfaces. Said apparatus have the drawback of requiring long and laborious operations for preparing and assembling the masks. Furthermore they have the disadvantage to pollute the environment of operation with the dust unavoidably escaping from the apparatus and to dirty surrounding parts, things or persons.

Another type of apparatus provides for the marking with the aid of a warm punching system. Said system is adapted for the marking of surfaces consisting of plastic material or having a covering of plastic material or surfaces of wood or other similar materials. These apparatus require a long time for preparing and arrange the punching device applying the personal wording on the surface and are limited in their use capabilities.

To attain the same purpose the present invention provides an operative method and an apparatus for carrying out this method in which the elements forming the wording to be marked, i.e. numbers, letters or symbols, are set in a computer or controller provided with a keyboard and a display, means being provided that for each type or element of the mark generates an electrical signal containing the information of the form and the size of each type and the sequence of said types. Said signals are transferred to an electromechanical apparatus with a rotating mill for engraving the mark type by type on the surface. The marking essentially begins just after the wording of the mark being arranged into the computer, operation that requires only a short time. It is also provided to use a controller with means for printing and storing the applied wording complete with all personal information regarding the user availing himself of this service.

The present invention essentially provides the use of a controller or computer associated to an electromechanical apparatus. The controller or computer is provided with a keyboard for setting the wording of the mark, a display of the setting data, an eventual printer, and means for storing said printed mark and the personal data of the owner of the marked thing, in particular a car. Of course, the method and the apparatus can be used for other purposes with suitable adaptation.

Said controller or computer is arranged to supply, after a number, a letter or a symbol being set by the respective button of the keyboard and after the setting of information relative to the specific characteristics of each type, electrical signals to the electromechanical apparatus which is arranged to translate said signal of predetermined duration into a rotation movement of the rotating tool, in particular a mill of the like, into a shift towards an operative or nonoperative position of the head of said tool and into separated or simultaneous movements of said head in two directions perpendicular to each other and to the direction of the rotation axis of said tool so that the rotating head of the tool is capable to engrave the surface to be marked reproducing type by type the numbers and/or letters and/or symbols of the mark.

These and other features of the invention will be more readily apparent from the following description of a preferred embodiment of the apparatus of the present invention with reference to the accompanying drawing, in which:

FIG. 5 shows the block diagram of the controller or computer;

FIG. 6 is the block diagram of the printed circuit board of the microcomputer of FIG. 5;

FIG. 7 shows the detail of a circuit controlling the shift of the tool along the axis x and y, respectively;

FIG. 8 shows the detail of a circuit of the contact sensor;

FIG. 9 shows the detail of the circuit regarding the control of operation;

FIG. 10 shows an example of the reproduction of a type of the mark; and

Figure 1:
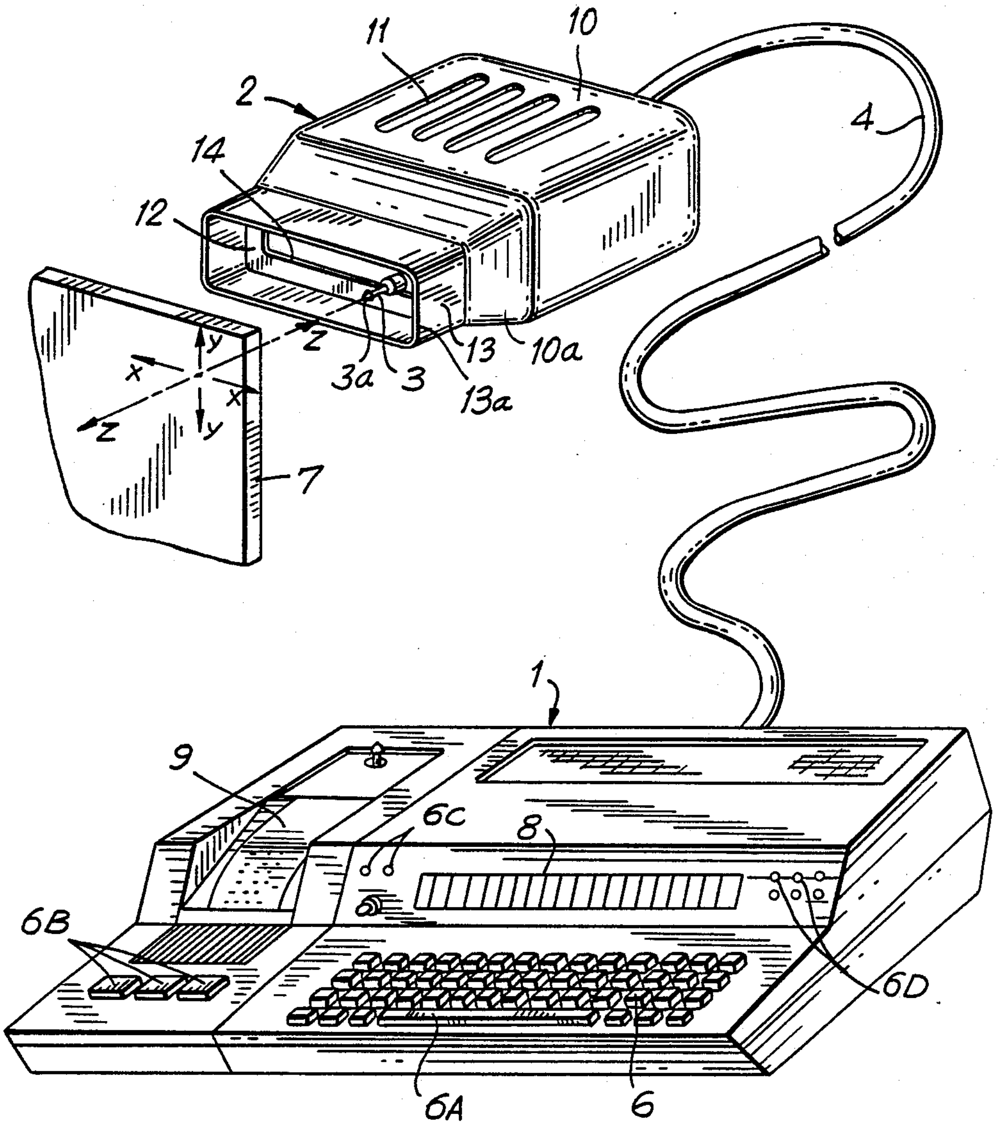
FIG. 1 is a perspective schematic view of the complete apparatus according to the present invention.

With reference to FIG. 1 the controller or computer is generally designated by 1 and the electro-mechanical apparatus by 2, said apparatus translating the signals supplied by the unit 1 into movements of the tool 3 having an engraving rotating head 3*a*. Said units 1 and 2 are connected to each other by means of a cable 4. In the illustrated embodiment the unit 1 is provided with a keyboard 5 of the conventional type, i.e. having control or function buttons 6A, 6B, 6C, and 6D and buttons 6 for the setting of the wording or mark to be engraved on the thing to be marked, in particular the surface of a plane or slightly curved wall 7. The apparatus 1 is also provided with a display 8 showing the numbers, letters or symbols of the mark which has been set by the buttons 6.

By means of a solution known by itself a means is provided in the apparatus for printing the wording of the mark on at least a strip of paper 9 and for further adding beside each mark the personal data of the user availing himself of the service, said data being also stored into the computer for statistic and/or research purposes.

The apparatus 1 is made using the technology of the art and is capable to supply electrical control signals which are compatible with the technology of the apparatus 2.

It should be appreciated that the scope of the present invention is that the head 3*a* of the rotating tool 3 is caused to move and to engrave type by type on the surface 7 any type of the wording or mark according to the succession of types set into the computer, duly spacing the types apart from one another. This is accomplished for the fact that the tool 3, 3*a* under operation is caused to shift in a plane along two axis X-Y perpendicular to each other. Said shifts can be carried out successively or at the same time in order to engrave the curved portions of the types as better illustrated herebelow. Furthermore, the tool 3, 3*a* is either caused to approach the surface 7 to be marked at a given time and for a predetermined period of time or to move away from it, means being also provided varying the depth of the cut.

The device 2 consists of a case 10 provided with air openings 11 and tapered at its front portion 10*a* which is closed by a plane wall 12 provided with a longitudinal slit 14 the length of which is equal to the maximum length F of the succession of types forming the mark. The height of such a slit 14 is a little higher than the height E of the types forming said mark. The rotating tool 3, 3*a* projects from said slit 14. The front wall 12 of the case 10 is surrounded by a side protection wall 13 extending outwards and being parallel to the axis of rotation Z—Z of the tool 3, 3*a*. The outward extension of said wall is such that the head 3*a* is located in a retracted position with respect to the edge 13*a* of the wall 13 so that said tool is protected from a collision during the shifting of the device 2. Referring now in particular to the device 2 of FIGS. 2 to 4, a central moving assembly generally designated by 15 provides a motor 16 driving the tool 3, 3*a* and installed on a case 17 housing the gearbox not shown in detail as it is of conventional type. The case 17 is provided with an enlarged head 17*a* which projects partially from the case 17 and forms an edge or shoulder 18. Said head is provided with a hole 19 in which the spindle 20 supporting the tool 3, 3*a* is passed. The case 17 is supported so as to shift with respect to the rotation axis Z—Z of the tool 3, 3*a* within a tubular guide means 21 provided with flanges 21*a* diametrally opposite to each other and projecting towards the longitudinal walls of the case 10 while facing the shoulder 18 of the head 17*a*.

Pressure springs 22 are placed between said flanges 21*a* and said shoulder 18. Housed in the case 17 is an electromagnet (not shown) causing the case 17 with its head 17*a* and the whole assembly, in particular the tool 3, 3*a*, to be returned to the non-operative position and to be locked in said position until a releasing signal is fed to the electromagnet. Afterwards the springs 22 cause the case to shift and to press the head 17*a* against the surface 7 to be marked, while another signal switches on the motor 16 and still another signal causes the head to move along the surface 7 to be milled with a predetermined depth which can be set by an already known means associated to the spindle 20.

The assembly 15 is hanged by the flanges 21*a* of the guiding support 21 at the lower ends of two parallel arms 23A, 23B. The arm 23A at its upper end is provided with a longitudinal, inside threaded hole in which a longitudinal threaded shaft 55 is screwed which is supported freely rotating about its axis by a pair of transversal walls 24A, 24B of the case 10 which are parallel to each other.

The threaded shaft 55 (FIG. 3) is connected to a driving motor 25 by a suitable gearbox. The arm 23B is supported by a toothed rod 26 provided with end support means 26*a*, 26b of cylindrical form which in turn are supported by the wall 24A, 24B so as to be rotated together with the rod 26 about their axis by a motor 27.

Provided in the upper end of the arm 23B is a longitudinal hole 29 formed so as to allow the toothed rod 26 to freely shift within said hole.

A plate 28 extending towards the wall 24A with an arm 30 is fastened to the inside wall of the arm 23B near the upper end thereof. The arm 30 supports by its portion 30a a shaft 31 which is parallel to the axis Y and on which a toothed wheel 32 engaging the toothed rod 26 is journalled. The shaft 31 is connected by a suitable gear means to the cursor of a potentiometer generally designated by the block 33. When the motor 25 is driven the threaded shaft 55 rotates and engages the threaded hole, thus acting as lead screw so that the whole linked parallelogram assembly formed of the two arms 23A, 23B with the assembly 15 hanged at their lower ends by the flanges 21 is caused to move forwards or backwards. In this way the whole assembly can shift in the direction of the axis X according to the direction of rotation of the shaft of the motor 25, thus moving parallely to the longitudinal axis of the slit 14 of the case 10. Such shifts in said direction are sensed by the toothed wheel 32 engaging the toothed rod 26 and then rotating by an angle representing the displacement along the axis X, said angle being detected by the potentiometer 33 supplying time by tyme the information of the working position of the head 3*a* of the tool 3 along said axis X. On the ground of such an information the controller (1) will either establish the path to be engraved or the non-operative condition by driving the assembly in the case 17 having the function of causing the tool 3 to be approached or moved away from the surface 7 to be marked.

Figure 2:
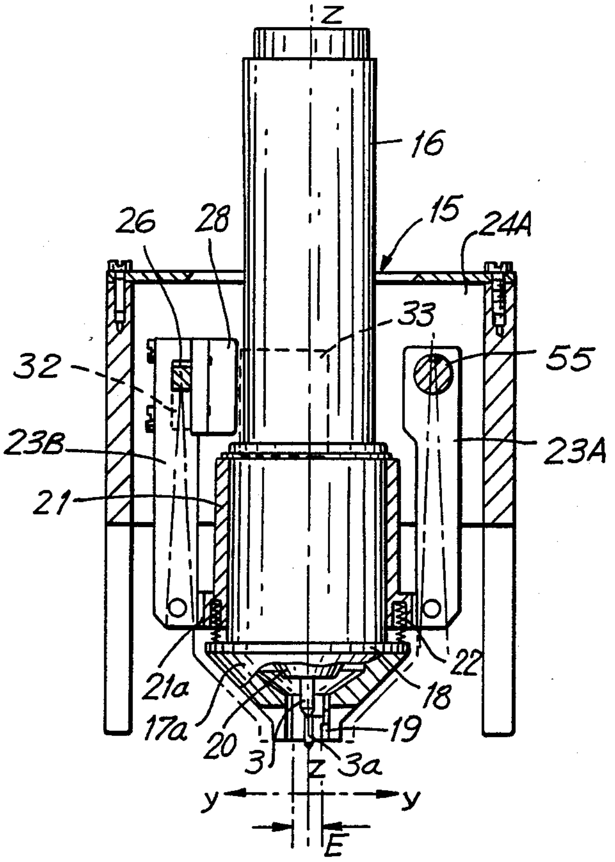
FIG. 2 is the schematic cross-section of the electromechanical apparatus taken along the line A—A of FIG. 3, the outer case being eliminated.

On the contrary, the maximum displacement of the head 3*a* of the tool 3 is designated by E in FIG. 2. Said displacement, in case of the particular above mentioned purpose of the invention, i.e. the marking of parts of a car or the like, is at the most about 6 mm, i.e. a very low amount. Therefore, said displacement is carried out by means of an oscillation of the hanged parallelogram assembly. To this end the motor 27 transmits a rotation to the rod 26 by the cylindrical support 26*a* of said rod 26 located at the end thereof near to said motor 27. As a result the rod 26 rotates with a reduced speed by an angle equal at the most to about 5° in the case of the illustrated embodiment. Such a rotation causes the rod 26 together with the arm 23B to rotate about its axis and the tool 3, 3*a* to move with respect to the central position shown in FIG. 2 to one side or the other side so that the head 17*a* of the assembly 17 can reach at the most one of the two limit positions indicated by dashed lines (FIG. 2).

The cylindrical support 26*b* opposite to the rod 26 is connected to a potentiometer 34 controlling the shifts of the tool in the direction of the axis Y and providing the information of the displacement to the controller 1 to which the signals from the potentiometers 33 and 34 are fed under the form of a d.c. voltage +V with respect to ground.

Figure 3:
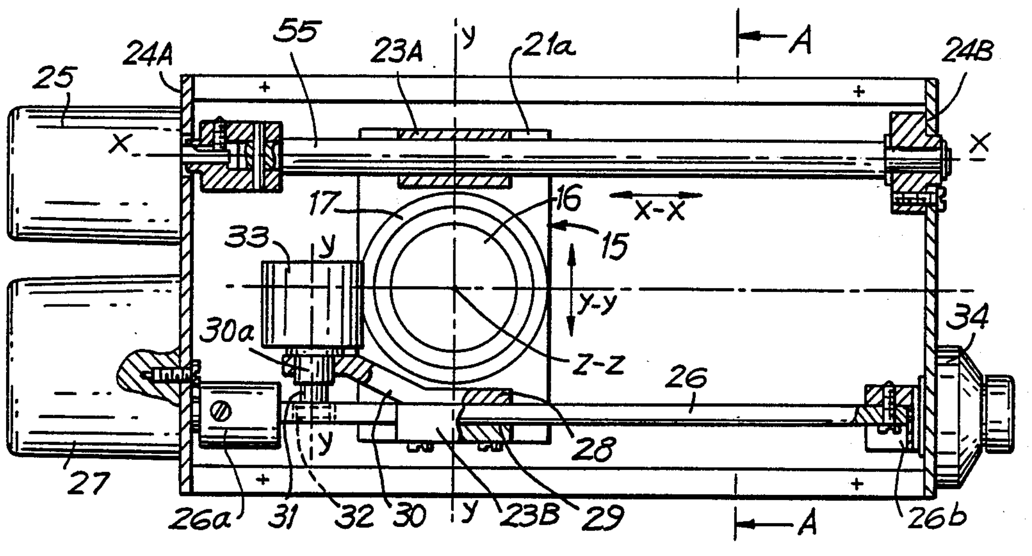
FIG. 3 is a top view of the apparatus of FIG. 1.
Figure 4:
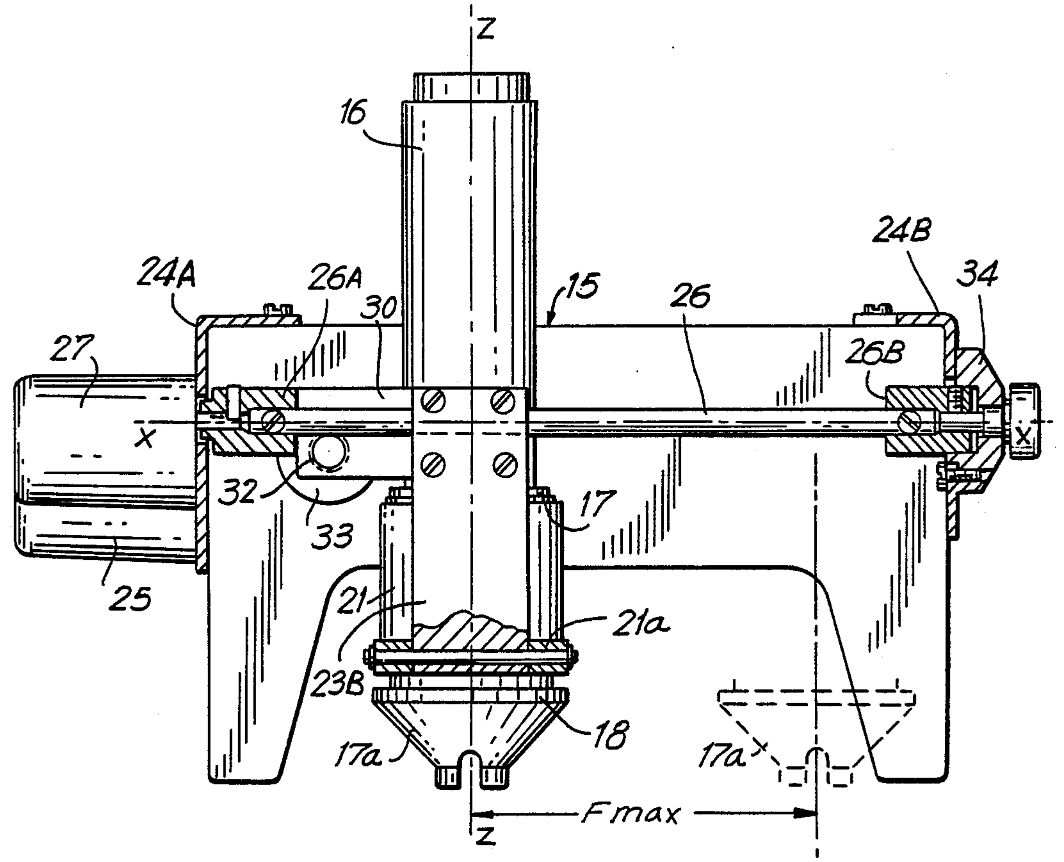
FIG. 4 is a side, longitudinal, partially cut-away view of the apparatus, the side supporting wall being eliminated.

It is to be noted that in the illustrated embodiment the maximum shift F max in the direction of the axis X is shown in FIG. 3, said shift being equal to about 75 cm in the illustrated embodiment.

The operation of the apparatus 1 will be now briefly described herebelow.

Referring to the FIGS. 5 to 11 a general block diagram is shown in FIG. 5. In said block diagram the power supply is designated by 35 and consists of a circuit taking a suitable voltage and generating the voltages necessary for the operation of the circuits of the apparatus.

The power supply 35 is designated so as to supply the required currents at any output at the desired voltage and is protected from eventual short circuits which might result. Designated by 36 is a block or a card of the microcomputer (control process unit). Said card represents the heart of the system as all information from the operator to the machine and viceversa from the machine to the operator or to the various actuators come into this card. The task of the microcomputer is that of guiding the operator to let in data to be marked in a correct way.

The dialogue card 36 operator is held through the alphanumeric keyboard 5 by which the operator lets in data. Messages are given to the operator and the echo testing of the let in data is carried out by an alphanumeric display 8.

At the end of the let in phase the program routing in said card 36 will provide for transforming data in a format compatible to the input/output unit and will supply to the output interface 37 the data succession requested by the operator.

Furthermore the program controls time by time the actuators by means of a location control by the potentiometers 33, 34 associated to the horizontal feed motor 25 and to the vertical feed motor 27, respectively.

Designated by 38 in the block diagram of FIG. 5 is a sensor located in a suitable position and sensing the contact of the head 3*a* of the tool 3 with the wall 7 to be marked.

FIG. 6 shows the block diagram of the card 36 (CPU) of FIG. 5.

A microcomputer, e.g. type INTEL 8085 with a clock of 6136 MHz formed by the block 39, is used for this apparatus. The microcomputer 39 takes from a ROM 40 the instructions to be performed (program) and uses for counting purposes and for storing data a RAM 41. The ROM 40 is a read only memory from which it is only possible to take data.

The data of the RAM 41 can be written and taken at any moment.

The dialogue between the card 36 of the microcomputer 39 and the operator is performed by an address bus 42 and a data bus 43 along which data are exchanged.

The data bus 43 is bidirectional as it provides the data transfer both towards and from the microcomputer (CPU) 39.

The address bus 42 is unidirectional as only the microcomputer 39 can address such a bus.

In order to establish a connection in "parallel" on the data bus 43 it is absolutely necessary that the peripheral units not involved in the data exchange with the CPU 39 does not have any influence on the data bus 43, i.e. they should provide (the selected peripheral units excepted) on the data bus 43 a state of high impedance. This is achieved by providing each electronic unit connected to a data bus with a control line receiving signals that in the high state cause the high impedance to be provided and in the low state cause the data bus 43 to be engaged by the corresponding unit.

The management of said control lines is made by a decoder 44 that according to the addressing provides a low state on only one of the control lines.

FIG. 7 shows the detail of the output interface 37 concerning the control circuit of the feed motor 25 of the axis X. An identical circuit shown only dashed is provided for the motor 27.

The motors 25 and 27 are controlled by the card 36 of the CPU 39 causing according to their position the rotation in either the clockwise or the counterclockwise direction.

The relative position is sensed by supplying to the associated potentiometer 33 or 34 a stabilized voltage and by reading the output signal of the corresponding potentiometer. Thus a biunivocal correspondance between the read voltage and the position of the motor or rather the tool 3, 3*a* in the engraving phase is provided. The analog signal has to be converted into a digital signal for the microcomputer 39, the conversion being carried out by the block 45.

FIG. 8 is the circuit diagram of the contact sensor 38; and FIG. 9 is the circuit diagram of the actuating device. FIG. 10 shows by way of example an embodiment of the letter D.

Figure 11:
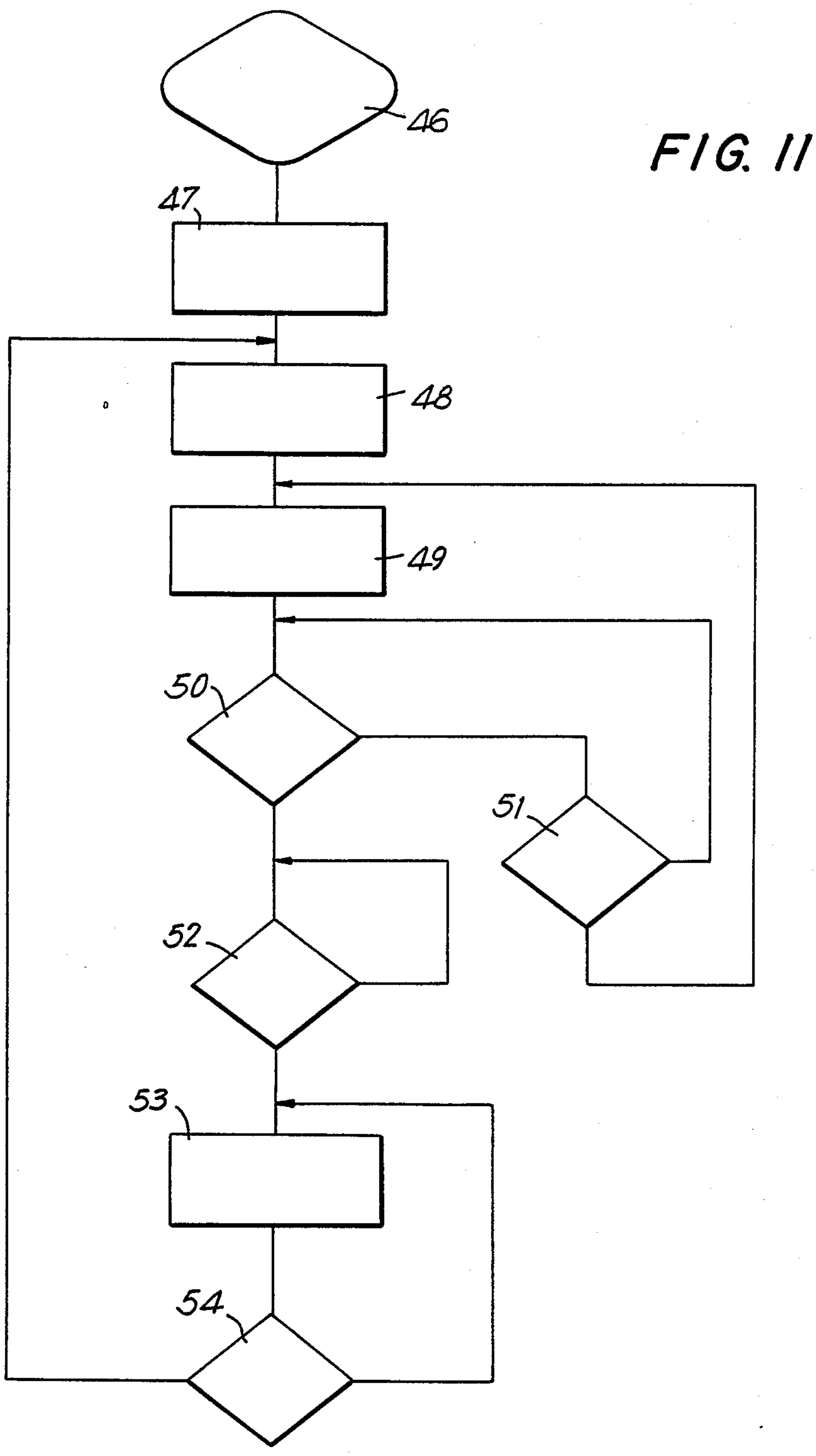
FIG. 11 is a flow chart of the machine

FIG. 11 is the flow chart of the machine. The block 46 indicates the switching on, the block 47 indicates the peripheral initialization, the block 48 indicates the disabling of the engraving tool, the block 49 is the request of let in data by the operator, the block 50 indicates the engraving phase, the block 51 indicates the let in of new data, the block 52 indicates that the tool 3, 3a is in the operative condition, the block 53 indicates that the tool 3, 3a is in operation and the block 54 indicates the end of the operation cycle.

I claim:

1. An apparatus for sequentially engraving a mark formed of letters, numbers or symbols on a plane or slightly curved surface (7), comprising: a tool (3, 3*a*) rotating about an axis (Z), a case (10) housing the tool (3, 3*a*) having an essentially rectangular cross section and provided with a front wall (12) having a longitudinal slit (14) parallel to a second axis (X) and perpendicular to first axis (Z), the slit having a height greater than that of the characters to be engraved on surface (7) and a length longer than that of the series of characters to be formed which is compatible with the setting of the apparatus (2), a peripheral shielding wall (13) projecting from the housing (10) is provided around the slit (14) from which the tool (3, 3*a*) projects, said wall projecting under non-operative conditions to such an extent so as to prevent the tool (3, 3*a*) from protruding beyond the edge (13*a*) of shielding wall (13), a driving motor (16) operatively linked to the tool (3, 3*a*) for causing the tool (3, 3*a*) to rotate in only one direction, support means (55) for holding tool (3, 3*a*) and motor (16) within the case (10, a tubular guiding support (21) integrally formed with the driving motor (16) and provided with longitudinal flanges (21*a*) parallel to the second axis (X), the tool (3, 3*a*) being supported by linked rods having axes parallel to the second axis (X) at the lower ends of two arms (23A, 23B) parallel to each other, and arm (23A) is provided at its upper end with an inside threaded hole therein having an axis parallel to the second axis (X) and in which the support means in the form of a longitudinal threaded shaft (55) is passed, support means (55) being supported at its ends by a pair of transversal inside walls (24A, 24B) of the case (10) and is connected at the nearest end with respect to the wall (24A) to a second driving motor (25) which rotates the support means (55) in two directions, while supporting arm (23B) at its upper end has a transversal hole (29) having a cross section cooperating with the outer shape of a longitudinal toothed rod (25) supported at its ends by cylindrical coaxial supports (26*a*, 26*b*) so that said rod can freely shift within said hole (29) and can be rotated about its axis by a third motor (27) rotating in two directions so that the rotation of said rod (26) about its axis causes the rotation of the arm 23B connected to the rod in a direction perpendicular to the first axis (Z) as well as the rotation of the assembly (15) and of the arm (23A) so that the head (3*a*) of the tool (3) is caused to move essentially parallel to a third axis (Y), a second support (21) housing a case (17) including the gear box connecting motor (16) to a spindle (20) which supports the tool (3, 3*a*) in an axially adjustable way, pressure springs (22) bias case (17, 17*a*) along with the tool (3, 3*a*) in an outward direction and are interposed between the two flanges (21*a*) of second support (21) and the head (17*a*) of the case (17), while an electromagnet positioned in the case (17) maintains the case (17) in a retracted condition when energized to expose tool (3), positioning means for transmitting movement to tool (3, 3*a*), positioning means setting the position of assembly (15) within a supporting framework so as to carry out separately or simultaneously shifts parallel to the second axis (X) and the third axis (Y), respectively, said second and third axes being perpendicular to each other and to the first axis (Z), second motor (25) and third motor (27) cooperatively linked to a positioning means for control thereof, whereby tool (3, 3*a*) can follow a path allowing the selected character to be engraved on the surface (7), sensor means provided in the assembly (15) to supply information when head (3*a*) of tool (3) is in contact or not in contact with the surface (7) to be marked, a controller (1) operatively connected to the assembly having setting means (5) for setting the series of characters forming the mark, display means (8) for displaying the set mark, print means for printing the set mark on a piece of paper (9) or for storing it by adding eventual personal data of the user, the controller (1) further including storage means for storing the information relative to the form and size of the type conversion means for converting such information into electrical signals, control means for controlling the beginning and the end of the engraving operation under the control of the setting means, retrieval means for taking successively from the memory the information relative to the form and the size of each character and to the sequence of setting, and second conversion means for converting said signal into control signals able to switch the apparatus (2) on or off in order to cause tool (3, 3*a*) to carry out the requested movements at the desired time and for the predetermined period of time by operating motors (16, 25 and 27).

2. An apparatus for sequentially engraving a mark which consists of letters, numbers or symbols, character by charcter, on a plane or a slightly curved surface comprising;

engraving means for forming the selected character in the surface by removing material from the surface in powdered form;

support means for supporting the engraving means;

travel means for causing the engraving means to travel along the outline of each character to be reproduced;

first movement means for moving the engraving means from a retracted inoperative position towards an operative position along a first axis (Z) perpendicular to the surface to be marked, the plane being substantially defined by a second axis (X) and a third axis (Y), where the plane (X, Y) and the first axis (Z) are perpendicular to each other;

second movement means for moving the support means along a linear path parallel to the second axis (X);

third movement means to impart micro-rocking movements in a plane perpendicular to the second axis (X) to the support means to displace the engraving means short distances substantially in the direction of the third axis (Y);

sensing means for sensing contact of the engraving means with the surface to be marked and actuating, either independently or jointly, the second movement means and the third movement means;

signal controller means for generating signals for controlling the engraving means, travel means, first, second and third movement means, support means and sensing means, and input means for selecting the characters to be marked by the engraving tool.

3. The apparatus for engraving of claim 2, further including a cable (4) for connecting the input means to the engraving means (2) and wherein the engraving means comprises: a tool (3) including an engraving head (3*a*) characterized by the fact that the tool (3, 3*a*) is a micro mill rotating at high speed about the first axis (Z) thereof, a casing (10) for mounting the tool (3, 3*a*) dimensioned to be hand supported by the operator and having a front wall (12) containing a longitudinal slit (14) therein, the length of the slit (14) extending parallel to the first axis (X) and the height thereof extending parallel to the second axis (Y), the slit (14) having a height greater than the height of the characters to be engraved on the surface (7) and a length longer than the length of a mark having the maximum number of characters; a peripheral shielding wall (13) encircling the slit (14) projecting outwardly from the casing (10) to such an extent so as to prevent the tool (3, 3*a*) from protruding beyond the edge thereof when tool (3, 3*a*) is in the retracted position;

an assembly (15) supporting the tool (3, 3a) mounted in the casing (10), the assembly (15) including motor means (16) for driving the tool (3, 3*a*); a tubular guiding support (21) integrally formed with the motor means (16); longitudinal flanges (21*a*) extending outwards from guiding support (21) parallel to the third axis (Y); a casing (17) for housing (3, 3*a*) supported on said tubular support (21), a spindle (20) which supports the tool (3, 3*a*) in an axially adjustable way, a gearbox connecting the motor (16) to the spindle, helical pressure springs (22) having axes parallel to the first axis (Z) and being interposed between flanges (21*a*) and the head (17*a*) of the casing (17) bias the casing (17, 17*a*) of the tool (3, 3*a*), and wherein the first movement means includes an electromagnet placed in the casing (17) maintaining the casing (17) in a retracted condition when energized to expose the tool head (3*a*) and whereby tool head (3*a*) operates under the control of signals from the controller (1) operating under the control of the sensor means (38) sensing the contact of the head (3*a*) with the surface (7) and according to the order of the various marks to be reproduced.

4. The apparatus for engraving of claim 3, further including pivot means for pivoting the tool (3, 3*a*) including two arms (23A, 23B) parallel to each other, assembly (15) being supported on the two arms (23A, 23B), one arm (23A) having a threaded hole therethrough having an axis parallel to the second axis (X), a longitudinal, finely threaded shaft (55) of a very small pitch extends through the hole, a pair of opposed transverse internal walls (24A, 24B) of casing (10) each supporting a respective end of the shaft (55), a drive motor (25) rotates the threaded shaft (55) in two directions, a supporting arm (23B) has at its upper end a hole (29) therein parallel to the second axis (X), a toothed rod (26) is supported by internal walls (24A, 24B) by cylindrical coaxial supports (26*a*, 26*b*) so that said rod can freely slide within said hole (29), a second motor (27) for rotating rod (26) in two directions through an angle of substantially 5° about its axis, whereby the rotation of said rod (26) about its axis causes the rotation of the arm (23B) in a plane perpendicular to the second arm (23*a*) so that the head (3*a*) of the tool (3) is caused to move essentially parallel to the third axis (Y), the second and third motors (25, 26) being controlled by the sensing means (38) only when sensing means (38) senses the contact of the tool (3*a*) with the portion of the surface (7) to be engraved.

5. The apparatus for engraving of claim 4 further comprising: a plate (28), wherein the arm (23B) supporting the toothed rod (26) is integrally formed with plate (28), an arm (30) supported by plate (28), a transverse shaft (31) supported on arm (30) and a wheel (32) engages the toothed rod (26) and is journalled by transverse shaft (31), whereby the amplitude of rotation of the wheel (32) along the toothed rod (26) causes the arm (30) to translate the information of the displacement of the tool (3, 3*a*) in the direction of the second axis (X) by means of an amp meter device (33) and the cylindrical end (26*b*) of the toothed rod (26) is connected with the cursor of a potentiometer (34) to sense the displacement of the tool (3, 3*a*) with respect to the third axis (Y) as a function of the rotation angle of the rod (26) about its axis.

6. A method for sequentially engraving a mark which consists of letters, numbers or symbols, character by character on a plane or slightly curved surface, comprising:

positioning an engraving apparatus against a surface to be marked, the engraving apparatus including a housing, engraving tool means mounted for movement in the housing, the engraving tool means for engraving the characters by removal of material from the surface to be marked, tool displacement means for positioning the tool means within the housing, including Z positioning means for fixing the position of the tool means along a Z axis from the surface, the surface defined by perpendicular axes X and Y, then X and Y axes perpendicular to the Z axis, the Z positioning means adapted to displace the tool means from an inoperative position away from the surface to an operative position contacting the surface, sensing means for determining the X, Y and Z position of the tool means, pressure sensing means for maintaining contact with the surface to be marked and constant engraving depth, input means for selectively inputting instructions for characters to be engraved and for applying signals to the displacement means for positioning and operating the tool means; and inputting selected characters to the input means;

operating the tool means to remove material in a powdered form from the surface to be marked;

sensing the contact of the tool with the surface to be marked and either independently or jointly moving a support in which the tool is supported along a path parallel to a first axis (X) and moving a micro support in micro rocking movements in a plane perpendicular to the first axis (X) displacing the tool in short distances substantially in the direction of a second axis (Y).

7. An apparatus for engraving characters on a substantially planar or curved surface, comprising:

a housing;

engraving tool means mounted for movement in the housing, the engraving tool means for engraving the characters by removal of material from the surface to be marked;

tool displacement means for positioning the tool means with the housing, including Z positioning means for fixing the position of the tool means along a Z axis from the surface, the surface defined by perpendicular axes X and Y, the X and Y axes perpendicular to the Z axis, the Z positioning means adapted to displace the tool means from an inoperative position away from the surface to an operative position contacting the surface;

sensing means for determining the X, Y and Z position of the tool means;

pressure sensing means for maintaining contact with the surface to be marked and constant engraving depth; and input means for selectively inputting instructions for characters to be engraved and for applying signals to the tool displacement means for positioning and operating the tool means.

8. The apparatus for engraving of claim 7 wherein the Z displacement means includes electromagnetic means for displacing the tool means along the Z axis.

9. The apparatus for engraving of claim 7, wherein the X displacement means includes a threaded shaft parallel to the X axis and an X axis motor coupled to the shaft and the tool means mounted on the threaded shaft for operation therewith, the tool means displaced in the X direction by rotation of the threaded shaft by the X axis motor.

10. The apparatus for engraving of claim 7, wherein the Y displacement means includes a micro-rocking movement means for rocking the tool means along the Y axis.

11. The apparatus for engraving of claim 10, wherein the micro-rocking means includes two upper shafts mounted in the housing parallel to the X axis and two arms supported by the shafts rotatable thereon, with the tool means mounted for rocking movement on the lower portion of the two arms.

12. The apparatus for engraving of claim 11, wherein the rocking movement is for an angle of about 5° along the Y axis.

13. The apparatus for engraving of claim 7, wherein the housing is formed with an elongated slit with the tool means projecting therefrom, and a peripheral shielding wall about the slit shielding the tool means when in the inoperative position and the tool means excluding beyond the wall when displaced to the operative position along the Z axis.

14. The apparatus for engraving of claim 7, wherein the housing is adapted to be hand held by an operator.

15. A method of engraving a mark on a substantially planar or slightly curved surface, comprising:

positioning an engraving apparatus against the surface to be marked, the apparatus including a housing;

engraving tool means mounted for movement in the housing, the engraving tool means for engraving the characters by removal of material from the surface to be marked, tool displacement means for positioning the tool means within the housing, including Z positioning means for fixing the position of the tool means along a Z axis from the surface, the surface defined by perpendicular axes X and Y, the X and Y axes perpendicular to the Z axis, the Z positioning means adapted to displace the tool means from an inoperative position away from the surface to an operative position contacting the surface, sensing means for determining the X, Y and Z position of the tool means, pressure sensing means for maintaining contact with the surface to be marked and constant engraving depth, and input means for selectively inputting instructions for characters to be engraved and for applying signals to the displacement means for positioning and operating the tool means;

inputting selected characters to be marked to the input means, whereby the tool means is displaced from its inoperative position to the operative position along the Z axis and the characters are engraved by removing material from the surface.

* * * * *